(No Model.) 2 Sheets—Sheet 1.
C. S. PAGE.
CORN PLANTER AND CHECK ROW ATTACHMENT.
No. 291,393. Patented Jan. 1, 1884.
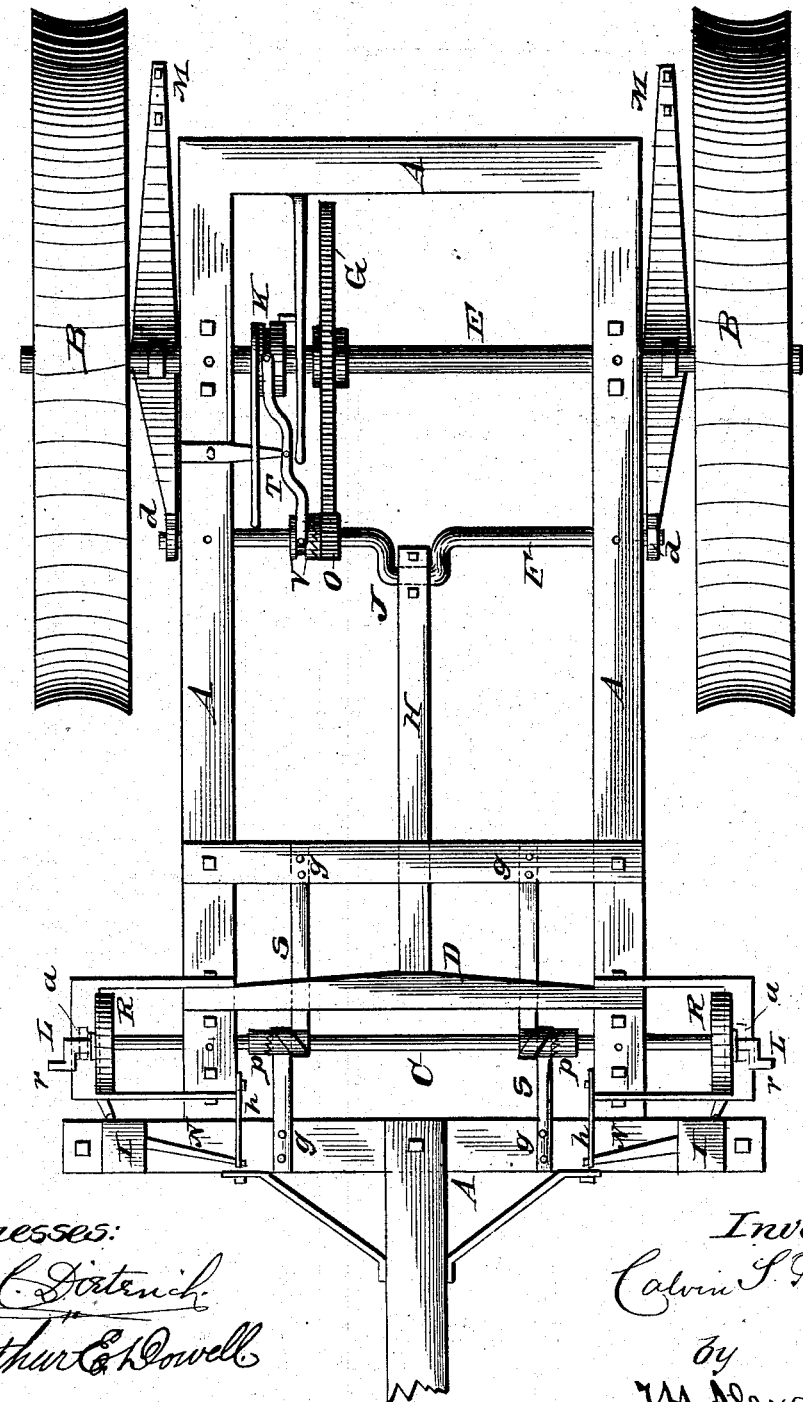
Witnesses:
Phil C. Dietrich
Arthur E. Dowell
Inventor:
Calvin S. Page.
by
J. W. Alexander
Attorney.

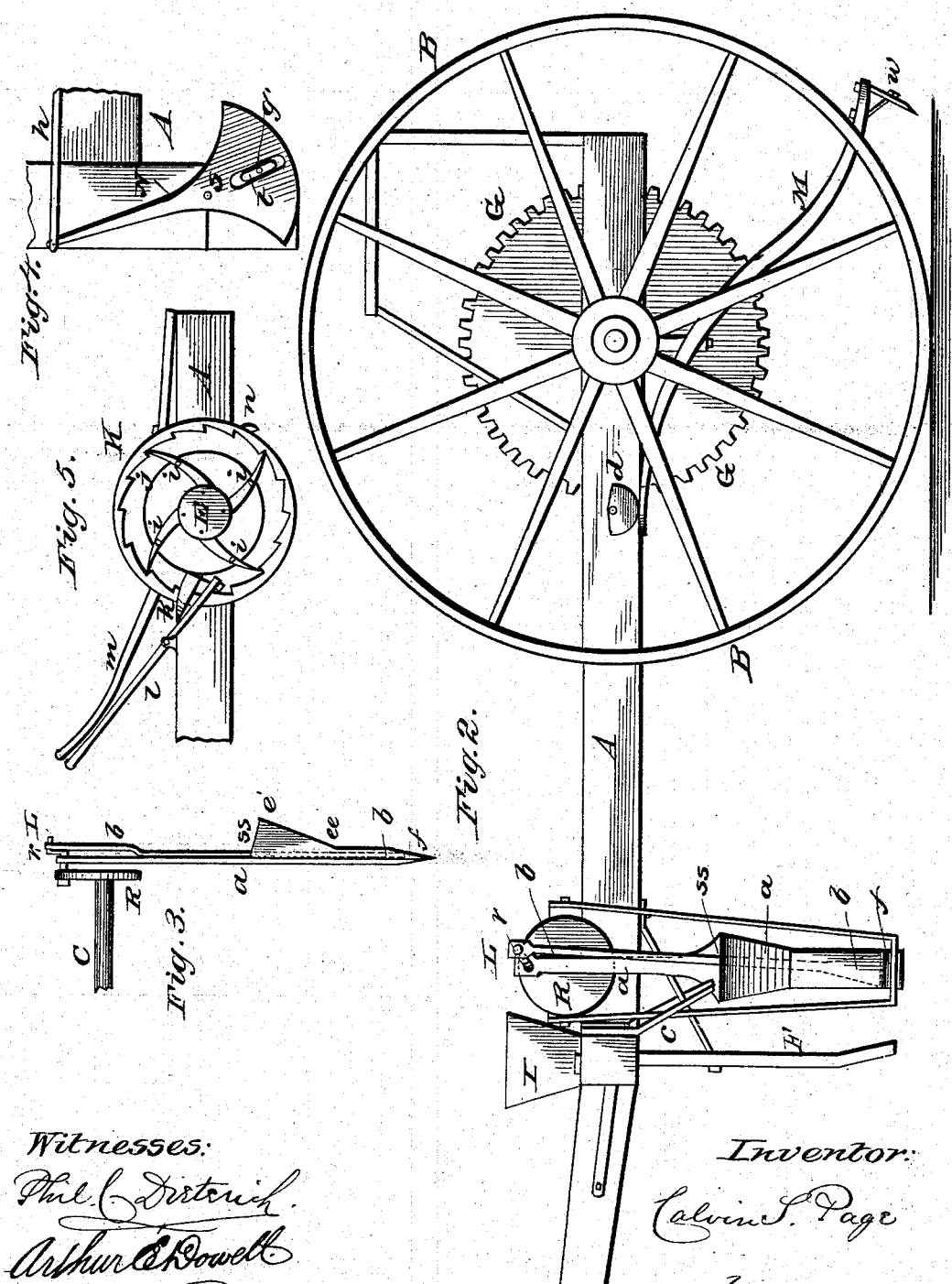

UNITED STATES PATENT OFFICE.

CALVIN S. PAGE, OF CHAMPAIGN, ILLINOIS.

CORN-PLANTER AND CHECK-ROW ATTACHMENT.

SPECIFICATION forming part of Letters Patent No. 291,393, dated January 1, 1884.

Application filed March 22, 1883. (No model.)

*To all whom it may concern:*

Be it known that I, CALVIN S. PAGE, of Champaign, in the county of Champaign and State of Illinois, have invented certain new and useful Improvements in Corn-Planters and Check-Row Attachments; and I do hereby declare that the following is a full, clear, and exact description thereof, reference being had to the accompanying drawings, and to the letters of reference marked thereon, which form a part of this specification, in which—

Figure 1 is a plan view. Fig. 2 is a side elevation. Fig. 3 is an end view of one of the hollow spades or planters which inserts the corn into the ground. Figs. 4 and 5 are detail views.

My invention relates to corn-planters which are adapted for sowing two rows at a time and check-rowing; and it consists in certain novel improvements in check-rowers and droppers, which will be fully understood from the following description when taken in connection with the annexed drawings.

A A designate the frame of the machine.

B B are the transporting-wheels, which are also used as driving-wheels.

E is the axle, to which is suitably keyed the spur-wheel G, which works the pinion O on the shaft F.

By means of the crank J and the connecting-arm H the frame D is caused to move backward and forward on the frame A. The shaft C in the frame D, on which are the wheels R, is made to revolve when the frame moves by means of the straps or chains S, which pass once or twice around the clutch-wheels $p$ on said shaft, and are fastened to the frame A at $g$. On the wheels R are the cranks L, which operate the spades or plungers $a$.

K designates a cam, having three throws, more or less. Each throw makes a drop. One end of a lever, T, works in the roadway and in the cam-wheel, and the other in the clutch-wheels V.

I I designate the corn-boxes; N N, the drop-levers, which latter are worked by the rods $h$ $h$, attached to the movable frame D. The frame D and its auxiliaries (shown in Figs. 1 and 2) move backward as fast as frame A moves forward, so that the spades or planters relatively to the ground are stationary while the drop is being made.

$c$ is the tube through which the corn passes from the hopper I into the hollow spade $a$ at $s$ $s$. The corn falls to the point $f$ below the tongue or plunger $b$, which, owing to its longer crank $v$, pushes the corn out of the hollow spade $a$ while it is in the ground. In Fig. 3, in which the last-named operation has been fully explained, the tubular attachment $e$ is securely fastened to the spade $a$ as far as the point $e'$, from which place down to the point it is held in position by the spring in the metal. The tongue or plunger $b$ serves also to keep the hollow spades from filling with dirt or water. The depth of the drop is regulated by placing the crank-pin L nearer to or farther from the center of the wheel R, or, if desired, farther by raising or lowering the tongue of the planter.

The plate N is moved backward and forward on the center $s$ by the rod $h$, which is attached to the frame D, and $g'$ is the device for regulating the number of grains to be dropped, the plate $t$ being used for regulating the capacity of the dropper or the hole through which the corn passes to the ground.

The cam-wheel K is fully illustrated in Fig. 5. The ratchets, with their projections at $i$, are attached to the axle E, and are designed for holding the wheel in position.

I use an open spring-ring, $j$, one end of which is attached to the frame at $k$, and the other end is attached to the lever $l$. By lifting the lever $l$ the ratchets are pressed to the center, and the wheel stops. By lifting the lever $m$ the hook $n$ catches in the teeth on the rim of the wheel and turns it forward. Thus the lever $l$ makes the drop later and the lever $m$ earlier.

M in Fig. 2 designates a marker, by means of which the places where the corn is dropped are checked. When a drop is made, the sectional wheel $d$, attached to the shaft F, turns and drops the plow $w$, which makes a mark one-half or two hills back of the hill dropped. An iron finger, $F^3$, depending from the frame D, when on the return row, indicates whether or not the hills are directly transverse to each other, or opposite those in the adjoining row, which, if they are not dropping opposite, can be made to drop, without stopping the machine, by using the levers *l* or *m*. An iron finger from the frame D, extending to the row, indicates where the machine is dropping, and also the times of dropping.

Having thus fully described my invention, what I claim as new, and desire to secure by Letters Patent, is—

1. The combination of the hollow spades or planters, having tubular or funnel-shaped attachments, the vertically-movable plunger *b*, and the movable frame D, all constructed and adapted to operate substantially in the manner and for the purposes described.

2. The combination of the movable frame D, the spades, a movable plunger, crank-pin *r*, wheel R, rotary shaft *c*, and check-rowing devices, all constructed and adapted to operate substantially in the manner and for the purposes described.

3. The combination of the movable frame D, the vertically-movable spades, the vertically-movable plunger, the arm H, the crank J, the gearing V G, the clutches *p*, and the straps S, all constructed and adapted to operate substantially in the manner and for the purposes described.

4. The combination of the cam-wheel K, lever T, and markers M, all constructed and adapted to operate substantially in the manner and for the purposes described.

5. The combination of the cam-wheel, the ratchet-teeth therein, the pivoted fingers or pawls *i*, the brakes *l j*, and the markers M, all constructed and adapted to operate substantially in the manner and for the purposes described.

In testimony that I claim the foregoing as my own I affix my signature in presence of two witnesses.

CALVIN S. PAGE.

Witnesses:
 E. FREEMAN,
 GEO. T. LEVEY.